Figure 1:
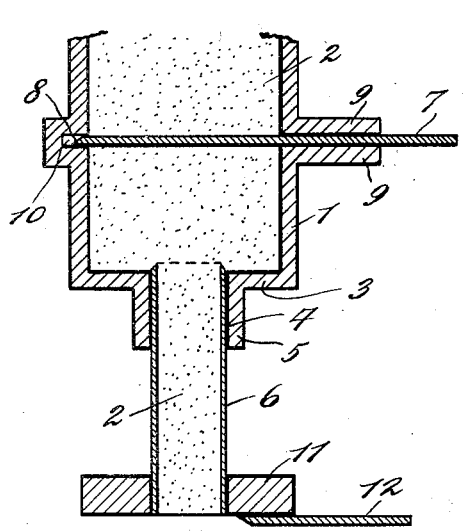

July 30, 1935. I. ELLIOTT 2,009,388
METHOD OF AND APPARATUS FOR ACTING UPON DOUGH
Filed Nov. 21, 1934 3 Sheets-Sheet 1

INVENTOR
Irwin Elliott
BY
Gifford, Scull & Burgess
ATTORNEYS

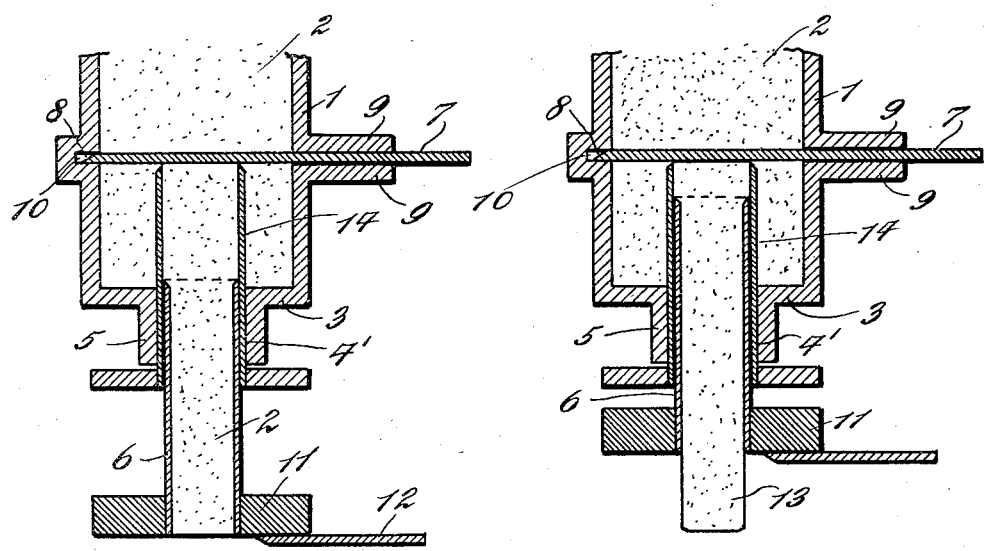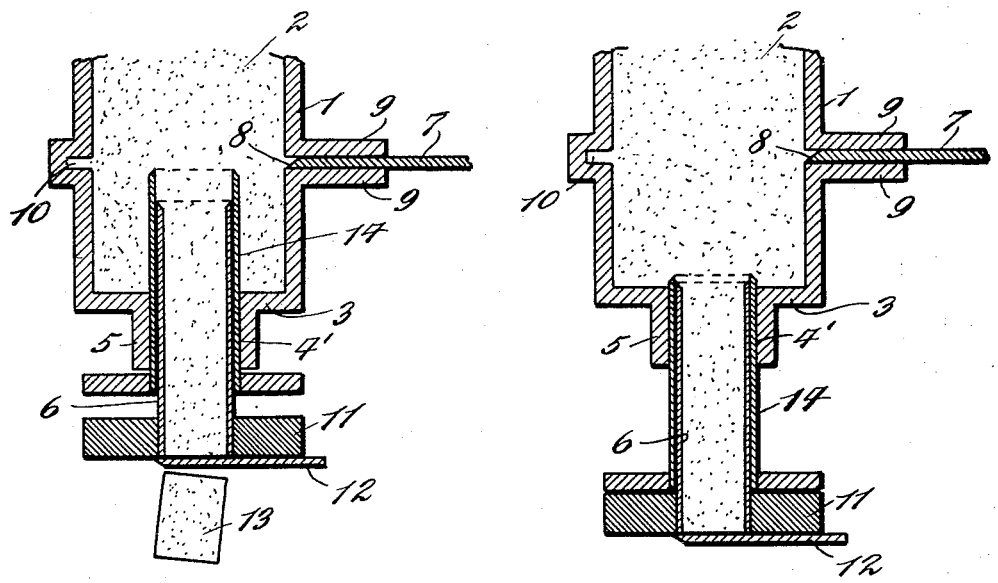

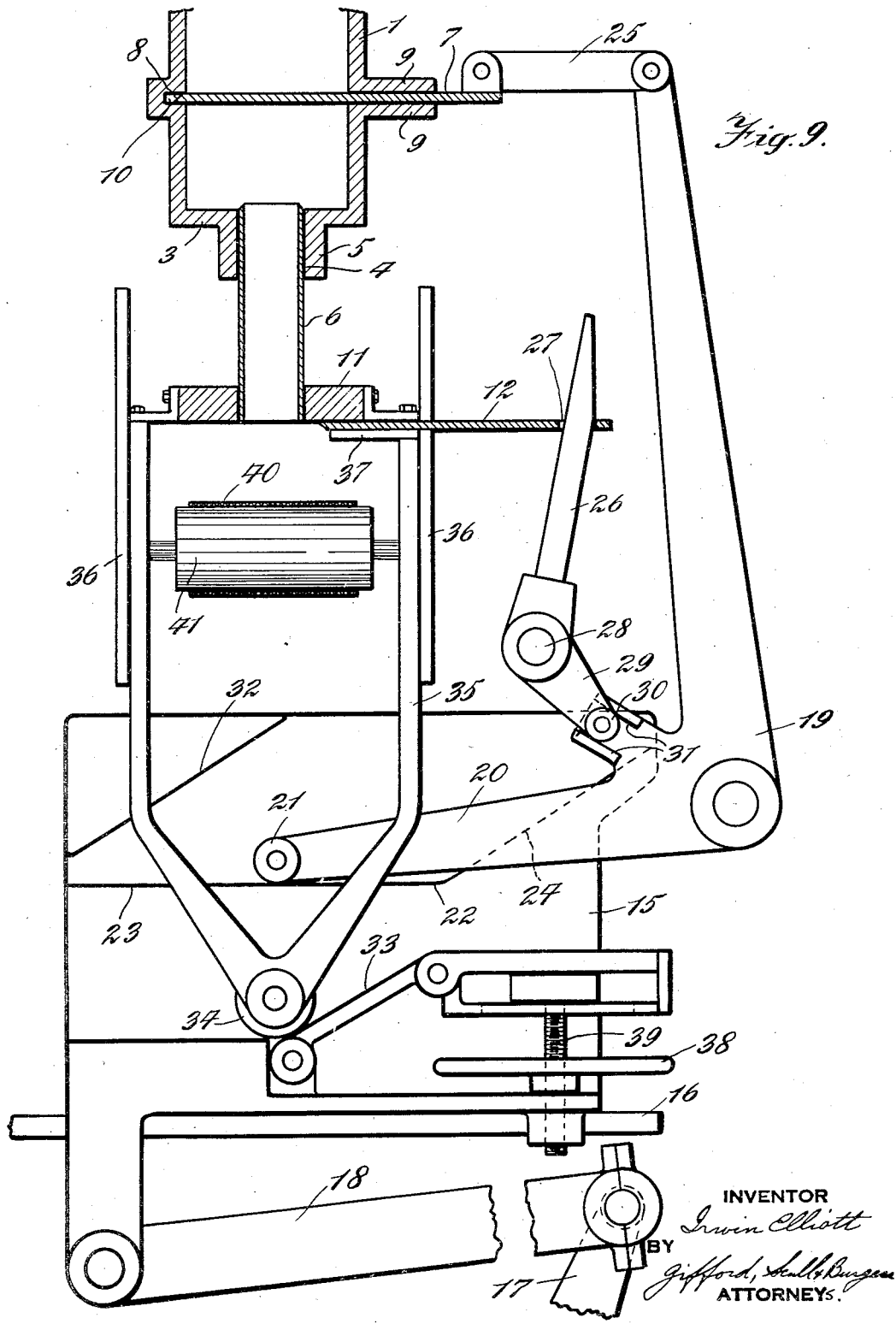

Patented July 30, 1935

2,009,388

UNITED STATES PATENT OFFICE 2,009,388

METHOD OF AND APPARATUS FOR ACTING UPON DOUGH

Irwin Elliott, Harmon, N. Y., assignor to Universal Oven Company, Incorporated, New York, N. Y., a corporation of New York Application November 21, 1934, Serial No. 754,027

10 Claims. (Cl. 107—14)

This invention relates to a novel and improved method of acting upon dough and to a novel and improved apparatus which may be used in the practice of the method. The invention will be best understood from the following description and the annexed drawings, in which I have shown successive steps of the method practiced by selected embodiments of the apparatus, and in which I have also shown a selected embodiment of the novel apparatus.

In the drawings, Figs. 1, 2, 3, and 4 show consecutive steps of the method according to one manner in which it may be practiced;

Figs. 5, 6, 7, and 8 are views corresponding to Figs. 1, 2, 3, and 4, respectively, but showing a different form of apparatus which may be used in the practice of the same steps of the method;

Fig. 9 is a vertical transverse section through one form of apparatus which may be used to operate the different parts appearing in Figs. 1, 2, 3, and 4.

Referring first to Figs. 1, 2, 3, and 4, I have shown therein a container in the form of a hopper 1, which may be of any suitable form and which is adapted to contain a mass 2 of dough or other plastic material. The invention is particularly adapted for use with bread dough, and therefore for the sake of convenience I shall hereinafter refer to the plastic material as dough, although it is understood that that word is not meant to limit my invention to the use entirely with that material, since it may be used with other material for which the invention is found suitable.

Also for the sake of convenience, I shall consider that the hopper is upright, and in defining the various parts I shall use the terms "vertical" and "horizontal", but it is to be understood that those terms and other expressions defining the relative positions of the parts are used for that purpose only and not to limit the invention to an arrangement in which the hopper is necessarily vertical.

In one wall of the hopper, here shown as the bottom 3 thereof, is an opening 4 surrounded by a bearing 5 depending from the bottom 3. Within this bearing is slidably mounted a tube 6 having a sliding fit with the walls of the hole 4. The cross-sectional configuration of the tube may take any form which is found suitable or desirable, and will normally depend upon the shape which it is desired to give to the cross-section of the finished articles of dough, as will more readily appear later.

Figure 2:
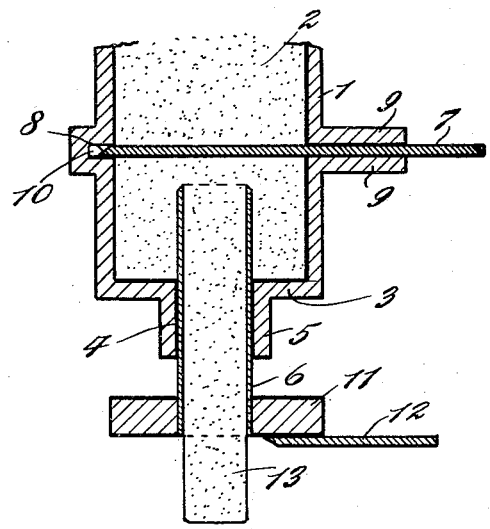
Figure 3:
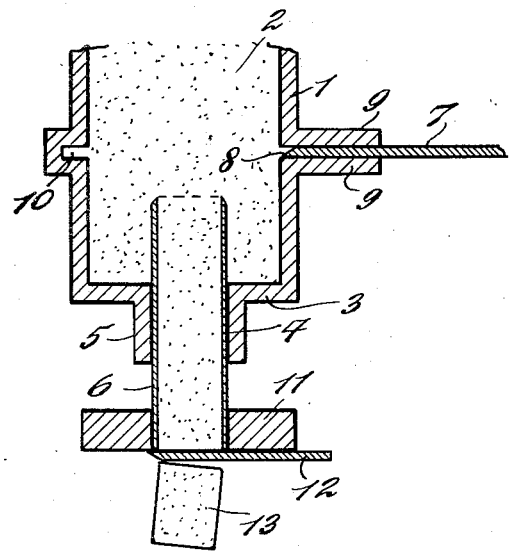
Figure 4:
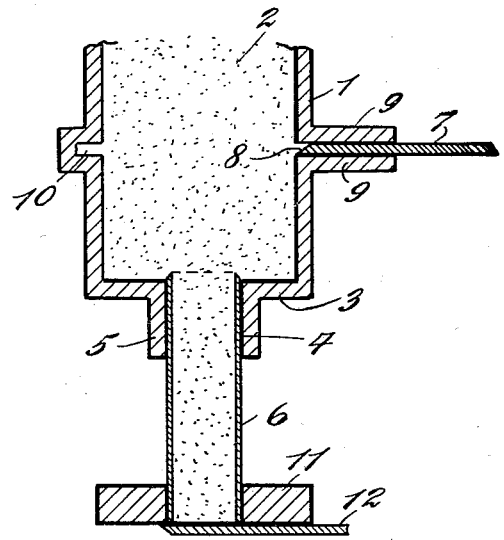

The tube is adapted to be moved into the mass 2 and to be retracted therefrom, its retracted position being shown in Figs. 1 and 4, and its innermost position being shown in Figs. 2 and 3. Slidably mounted so as to move transversely across the container and through the mass 2 therein is a stop 7 shown in the form of a thin plate having a knife edge 8 so that it may readily pass through the mass. The stop is supported between suitable bearings 9 integral with one of the side walls of the hopper, and may be supported within a recess 10 opposite the bearings 9.

Secured to the bottom of the tube 6 is an anvil 11, along the bottom surface of which is adapted to move a knife 12, this knife being movable vertically with the anvil and tube. Suitable mechanism for causing horizontal movement of the stop 7 and knife 12 and vertical movement of the tube with its anvil and with the knife 12 is provided, and one arrangement for causing these movements will be more fully described later.

The method illustrated in Figs. 1, 2, 3, and 4 will now be briefly described. The mass of dough is placed within the container formed by the hopper and caused to fill the tube 6, as indicated in Fig. 1. This tube may be full because of the dough left therein from the conclusion of the preceding cycle, or, if desired, one or two reciprocations of the tube may be made in order to fill it with dough.

In any event, at the start of the cycle of operations, the parts are in the position shown in Fig. 1, and it will be seen that the stop 7 has been moved inwardly across the hopper and through the mass of dough therein, thus separating that mass into two parts, one below and one above the stop. Next, the tube 6, anvil 11, and knife 12 are raised to some such position as indicated in Fig. 2. During this movement, it will be seen that the stop 7 will positively prevent the tube from pushing the dough upwardly so that it in effect forms an abutment against which the force exerted by the upward movement of the dough may act. The result is to force a portion 13 of dough outwardly so that it projects below the lower end of the tube 6 beneath the anvil 11.

The next step is illustrated in Fig. 3, wherein it is seen that the stop 7 is withdrawn, to permit more dough to enter the lower part of the container, at the same time as the knife 12 is operated to sever the portion of dough 13 by movement of the knife 12 along the bottom of the anvil 11.

The next step is illustrated in Fig. 4, which shows that the tube 6, anvil 11 and knife 12 have been moved downwardly so that the tube 6 is retracted from the dough in the hopper. These three parts are now in the same position as in Fig. 1, and, according to the next step, the stop 7 is moved inwardly through the dough while the knife 12 is withdrawn so that the parts return to the position shown in Fig. 1.

Referring now to Figs. 5, 6, 7, and 8, I have illustrated therein a series of steps corresponding generally to those illustrated in Figs. 1, 2, 3, and 4, and in these figures identical parts have been given the same identifying numerals as before. The embodiment here illustrated is of particular utility where the dough or the like is relatively elastic. Where the dough has a relatively high elasticity, the amount of force necessary to force the tube through it may vary so that the operation would not be uniform. In order to make for uniformity, particularly in the size of the portion of dough to be severed by the knife 12, I may use a segregating cylinder 14 vertically movable within the opening 4' which will normally be of somewhat larger size than the opening 4 of the first described embodiment, in order to accommodate the cylinder.

In use, the embodiment shown in Figs. 5, 6, 7, and 8 may be operated by first raising the cylinder 14 and then the tube 6 to the positions shown in Fig. 6 so that the portion 13 of the dough may extend below the lower end of the tube. During both these operations it will be seen that the stop 7 acts as before and that the cylinder 14 confines or segregates within its walls a definite amount of dough. In the upward movement of the tube 6, the tube slides within the walls of the cylinder 14, with which walls it has a sliding fit, and the dough within the cylinder cannot leave it except through the tube 6 because of the fact that the stop 7 is closely adjacent the upper end of the cylinder 14 in its upper position.

The next step is shown in Fig. 7, this step comprising the withdrawal of the stop and the severing of the dough 13 as before, and then the tube and the cylinder are retracted together to the position shown in Fig. 8.

It is of course to be understood that in both embodiments previously described, the upper edge of the tube may be sharpened, as indicated, so as to pass through the dough with the minimum of resistance in the same manner as the edge of the stop 7. The edge of the cylinder may be likewise sharpened, when that is used.

In Fig. 9, I have shown an apparatus which may be used for operating the part shown in Figs. 1, 2, 3, and 4. If the cylinder 14 is to be used, any suitable operating mechanism therefor may be provided by those skilled in the art. I have not deemed it necessary to show any such mechanism here.

Referring to Fig. 9, I have shown one hopper 1 and the parts associated therewith, it being understood that under normal operation there will be a battery of such hoppers which may all be supplied with operating mechanism similar to that shown in Fig. 9, and which may all operate together. Such mechanism may comprise a carriage 15 reciprocating upon bearing bars, one of which is shown at 16. This carriage may conveniently extend beneath a battery of hoppers 1 extending in a direction at right angles to the plane of the drawings. Reciprocation of the carriage may be achieved by any suitable means, such as a crank 17, connected to the carriage by a link 18.

Reciprocation of the carriage may operate the stop 7 and knife 12 by means of a bell crank lever 19 having one arm 20 provided with a cam roller 21 engaging a cam surface 22 upon the carriage. This cam surface has a dwell portion 23, here shown as horizontal, and also an actuating portion 24. When the roller 21 engages the dwell portion 23, the stop 7 remains inactive, whereas when the roller 21 engages the portion 24, then the bell crank lever is actuated to move the stop 7 through the connecting link 25.

The knife 12 may likewise be operated by rocking of the bell crank lever through a lever 26 received in a slot 27 of the knife and secured to a rock shaft 28. This rock shaft likewise has mounted thereon an actuating arm 29 having a roller 30 received between guides 31 on the bell crank lever.

From the above arrangement it will be seen that the stop 7 and knife 12 work together or are idle together, under the action of the dwell portion 23 or the actuating portion 24 of the cam surface 22.

The carriage 15 is likewise provided with a cam surface 32 which is adapted to engage the roller 21 to lower the roller and consequently to rock the bell crank lever 19 in the opposite direction from that caused by the portion 24 of the cam surface 22.

The parts are so timed that there is thus a rest period while the roller 21 is in engagement with the dwell portion 23 of the cam surface 22 and again after the portion 24 of the same surface leaves the cam roller 21 on the reciprocation of the carriage towards the right and until the roller 21 is engaged by the cam surface 32.

In Fig. 9 the parts are shown as they appear during one of these rest periods, namely, after the roller 21 has been brought downwardly into engagement with the dwell portion 23 and while the carriage is being moved towards the left. During this time, the tube 6 is raised, which may be done by means of a cam 33 upon the carriage engaging a roller 34 upon a frame 35 mounted to move between vertical guides 36 and carrying the anvil 11 and tube 6. The knife 12 is likewise mounted to slide between the anvil 11 and a supporting bracket 37 on the frame 35.

By the arrangement just described it will be seen that the anvil 11, tube 6, and knife 12 may all be reciprocated vertically as a unit, this reciprocation being permitted by the loose connection formed by the lever 26 passing through the slot 27.

The cam 33 may be made adjustable as by means of a hand wheel 38 operating on an adjusting screw 39, to vary the amount of dough extruded from the tube.

As indicated above, the hoppers and parts associated therewith are usually arranged in batteries, and running beneath such a battery I may supply a belt conveyor 40 running on rolls, one of which is shown at 41. Preferably, these rolls are carried on the frame 35 so that the position of the conveyor with respect to the lower ends of the tubes 6 is a constant one.

While I have described the invention as practiced according to a certain method, and have described that method as practiced by a certain embodiment of my novel apparatus, nevertheless it is to be understood that various changes in details of the method and apparatus may be made without departing from the scope of the invention, which is defined by the appended claims.

I claim:

1. Apparatus for acting upon dough, comprising a container for a mass of dough, a tube slidably mounted in a wall of said container and extending therethrough, means for moving said tube into the container and for retracting it therefrom, and means to sever dough projecting from the outer end of said tube.

2. Apparatus for acting upon dough, comprising a container for a mass of dough, a tube slidably mounted in a wall of said container and extending therethrough, means for moving said tube into the container and for retracting it therefrom, means to sever dough projecting from the outer end of said tube, a stop movable across the inner end of said tube, and means for moving said stop into and out of operative position across said tube end.

3. Apparatus for acting upon dough, comprising a container for a mass of dough, a tube slidably mounted in a wall of said container and extending therethrough, a frame supporting said tube, means to reciprocate said frame to move the tube into and to retract it from said container, a knife slidably mounted on said frame and reciprocable across the outer end of said tube, and means for reciprocating said knife on said frame.

4. Apparatus for acting upon dough, comprising a container for a mass of dough, a tube slidably mounted in a wall of said container and extending therethrough, a frame supporting said tube, means to reciprocate said frame to move the tube into and to retract it from said container, a knife slidably mounted on said frame and reciprocable across the outer end of said tube, means for reciprocating said knife on said frame, a stop movable across the inner end of said tube, and means for moving said stop into and out of operative position across said tube end.

5. Apparatus for acting upon dough, comprising a container for a mass of dough, a tube slidably mounted in a wall of said container and extending therethrough, a frame supporting said tube, means to reciprocate said frame to move the tube into and to retract it from said container, a knife slidably mounted on said frame and reciprocable across the outer end of said tube, means for reciprocating said knife on said frame, and a conveyor carried by and movable with said frame beneath the lower end of said tube and in fixed relation to said lower end.

6. Apparatus for acting upon dough, comprising a container, a tube movable into and retractable from said container and adapted to receive dough from said container, means for moving the tube into the dough in the container to cause some of the dough therein to project beyond the outer end of the tube, means for severing the projected dough, and means for retracting the tube from the container.

7. Apparatus for acting upon dough, comprising a container, a tube movable into and retractable from said container and adapted to receive dough from said container, means for moving the tube into the dough in the container to cause some of the dough therein to project beyond the outer end of the tube, means for severing the projected dough, means for retracting the tube from the container, and means for preventing movement of the dough in the container away from said tube as it passes thereinto.

8. Apparatus for acting upon dough, comprising a container, a tube movable into and retractable from said container and adapted to receive dough from said container, means for moving the tube into the dough in the container to cause some of the dough therein to project beyond the outer end of the tube, means for severing the projected dough, means for retracting the tube from the container, and a stop movable into the container across the inner end of said tube when in its innermost position, to prevent movement of the dough away from the tube as the tube is moved thereinto.

9. Apparatus for acting upon dough, comprising a container, a tube movable into and retractable from said container and adapted to receive dough from said container, means for moving the tube into the dough in the container to cause some of the dough therein to project beyond the outer end of the tube, means for severing the projected dough, means for retracting the tube from the container, and a segregating cylinder extending into said container coaxially of said tube and adapted to segregate the dough through which said tube moves.

10. Apparatus for acting upon dough, comprising a container, a tube movable into and retractable from said container and adapted to receive dough from said container, means for moving the tube into the dough in the container to cause some of the dough therein to project beyond the outer end of the tube, means for severing the projected dough, means for retracting the tube from the container, a segregating cylinder extending into said container coaxially of said tube and adapted to segregate the dough through which said tube moves, and a stop movable across the end of said cylinder, to prevent movement of the dough segregated within the cylinder as the tube moves inwardly in said cylinder.

IRWIN ELLIOTT.